United States Patent

Kashima et al.

Patent Number: 5,417,482
Date of Patent: May 23, 1995

[54] ANTILOCK MECHANISM FOR MOTORCYCLE BRAKES

[75] Inventors: Mitsuhiro Kashima; Nobumichi Hanawa, both of Gifu, Japan

[73] Assignee: Kayaba Kogyo Kabushiki Kaisha, Tokyo, Japan

[21] Appl. No.: 995,183

[22] Filed: Dec. 22, 1992

[30] Foreign Application Priority Data

Dec. 24, 1991 [JP] Japan .................. 3-341426
Sep. 8, 1992 [JP] Japan .................. 4-239586

[51] Int. Cl.⁶ ............................................. B60T 8/00
[52] U.S. Cl. .................... 303/112; 303/100; 188/72.2; 188/346
[58] Field of Search ............. 303/100, 111, 97, 105, 303/112; 188/72.2, 344, 346

[56] References Cited

U.S. PATENT DOCUMENTS

| | | | |
|---|---|---|---|
| 4,779,447 | 10/1988 | Rath | 303/100 X |
| 4,822,113 | 4/1989 | Amberg et al. | 303/112 X |
| 5,002,343 | 3/1991 | Brearley et al. | 303/7 |
| 5,005,916 | 4/1991 | Fujioka et al. | 303/111 X |
| 5,134,352 | 7/1992 | Matsumoto et al. | 303/100 X |

FOREIGN PATENT DOCUMENTS 64-90857 4/1989 Japan ................ 188/72.2

*Primary Examiner*—Robert J. Oberleitner
*Assistant Examiner*—Lee W. Young
*Attorney, Agent, or Firm*—Jordan and Hamburg

[57] ABSTRACT

In a motorcycle provided with a brake, a link supporting brake caliper is fitted to a wheel axle such that it is free to oscillate, an oil chamber being provided which enlarges or contracts according to the oscillation of this link, and which is connected to a pressure passage supplying oil pressure to the brake caliper. An electromagnetic valve is provided for opening and shutting this pressure passage, and a mechanism for detecting a prelock condition of the wheel. By shutting the electromagnetic valve when a pre-lock condition is detected, oil pressure supply to the brake caliper is shut off, and rise of braking pressure is prevented. If the pre-lock condition persists after the oil pressure has been shut off, the oil chamber is enlarged by varying the oscillation angle of the link so as decrease the braking pressure and prevent the wheel from locking.

2 Claims, 11 Drawing Sheets

ANTILOCK MECHANISM FOR MOTORCYCLE BRAKES

FIELD OF THE INVENTION

This invention relates to an antilock mechanism for preventing the wheel of a motorcycle from locking due to the action of a brake.

BACKGROUND OF THE INVENTION

An antilock mechanism for preventing the wheel of a motorcycle from locking due to the action of a brake is disclosed for example in Tokkai Sho 64-90857, Tokkai Hei 1-94056 and Tokkai Sho 2-127155 published by the Japanese Patent Office.

In these mechanisms, a torque detection rod is provided which is displaced according to the braking torque generated between a brake disc that rotates together with a wheel, and brake caliper that apply a braking force to the brake disc. This torque detection rod is mechanically linked to a regulator which adjusts the braking pressure.

When the wheel slips with respect to the road surface, the braking torque between the brake disc and the brake caliper decreases. The displacement of the detection rod consequently decreases and the regulator, by lowering the braking pressure according to this displacement, prevents the wheel from locking.

Such antilock mechanisms have a relatively simple structure, but as the braking pressure is controlled entirely by means of a mechanical link, it is difficult to accurately control the braking pressure depending on the varying slip factor.

SUMMARY OF THE INVENTION

It is therefore an object of this invention to accurately control braking pressure in a motorcycle depending on the slip factor while maintaining a simple structure.

It is a further object of this invention to accurately assess the state of the motorcycle wheels immediately prior to the locking of the wheels.

In order to achieve the above object, this invention provides an antilock mechanism for a motorcycle brake having a brake disc rotating together with a wheel about an axle, the axle being supported by a motorcycle frame via a support member, a brake caliper which applies a braking force to the brake disc depending on a supplied oil pressure, a master cylinder which generates oil pressure, a device for operating the master cylinder, and a pressure passage connecting the master cylinder to the brake caliper. This antilock mechanism comprises a link supporting the brake caliper connected to the axle such that it is free to oscillate, an oil chamber connected to the pressure passage, the chamber enlarging and contracting according to the oscillation of the link, an electromagnetic valve which can shut off the pressure passage, a device for detecting a pre-lock condition of the wheel, and a device for shutting off tile electromagnetic valve when the pre-lock condition is detected.

Preferably, the oil chamber is formed by a piston connected to the link inside a cylinder supported by the support member.

According to an aspect of this invention, the device for detecting the pre-lock condition comprises a sensor for detecting the pressure of the pressure passage, a device for detecting the brake torque acting between the brake caliper and the brake disc, and a mechanism for judging whether or not the ratio of the detected pressure and brake torque is within a predetermined range. The torque detecting device may comprises a sensor for detecting a moment acting on the link.

According to another aspect of this invention, the device for detecting the pre-lock condition comprises a sensor for detecting the rotation speed of a wheel, a switch for detecting the operation of the operation device, and a mechanism for judging whether or not the decrease of wheel rotation speed when the operating device is operated, is within a predetermined range.

According to a further aspect of this invention, the device for detecting the pre-lock condition comprises sensors for detecting the respective rotation speeds of the front and rear wheels, a switch for detecting the operation of the operating device, and a mechanism for judging whether or not the difference of rotation speeds of front and rear wheels when the operating device is operated, is within a predetermined range.

According to a still further aspect of this invention, the device for detecting the pre-lock condition comprises a sensor for detecting the pressure in the pressure passage, a sensor for detecting the load acting on the axle in the front direction, and a mechanism for judging whether or not the ratio of the detected oil pressure and detected load is within a predetermined range.

According to a still further aspect of this invention, the device for detecting the pre-lock condition comprises a sensor for detecting the pressure in the pressure passage, a sensor for detecting the deformation of the axle, and a mechanism for judging whether or not the ratio of the detected oil pressure and detected deformation is within a predetermined range, It is also preferable that the pressure passage is provided with an accumulator with a mechanism for regulating accumulated pressure.

It is also preferable that the pressure passage is provided with a pressure adjusting chamber with a piston driven by a solenoid to adjust the pressure in the pressure passage, The details as well as other features and advantages of this invention are set forth in the remainder of the specification and are shown in the accompanying drawings.

DETAILED DESCRIPTION OF THE PREFERRED EMBODIMENTS

Figure 1:
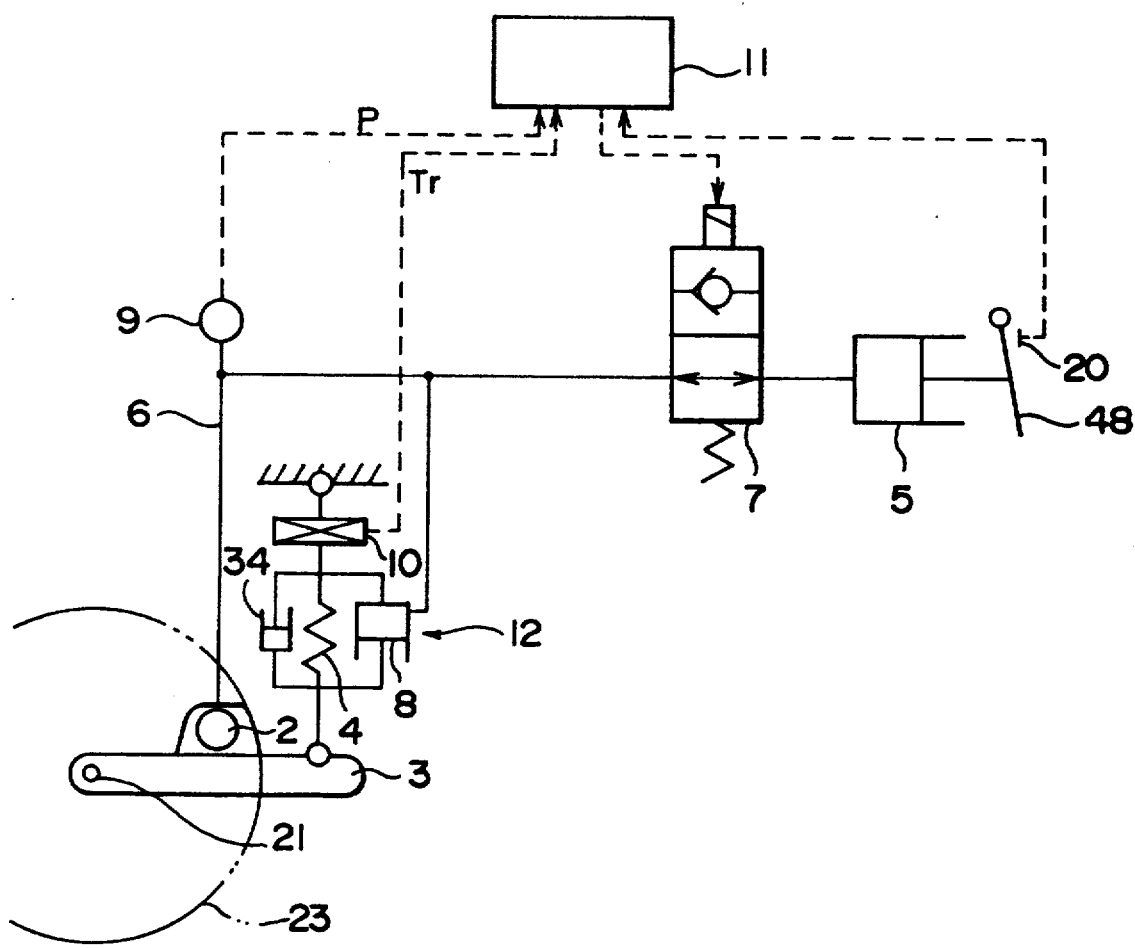
FIG. 1 is a schematic diagram of an antilock brake mechanism according to a first embodiment of this invention.

Referring to FIG. 1 of the drawings, when a brake pedal 48 is depressed, a master cylinder 5 is pressurized, oil is supplied via a pressure passage 6 to a brake caliper 2, and a brake pad inside the brake caliper 2 is pushed by this oil pressure against a brake disc 23 so as to brake the brake disc 23.

Figure 2:
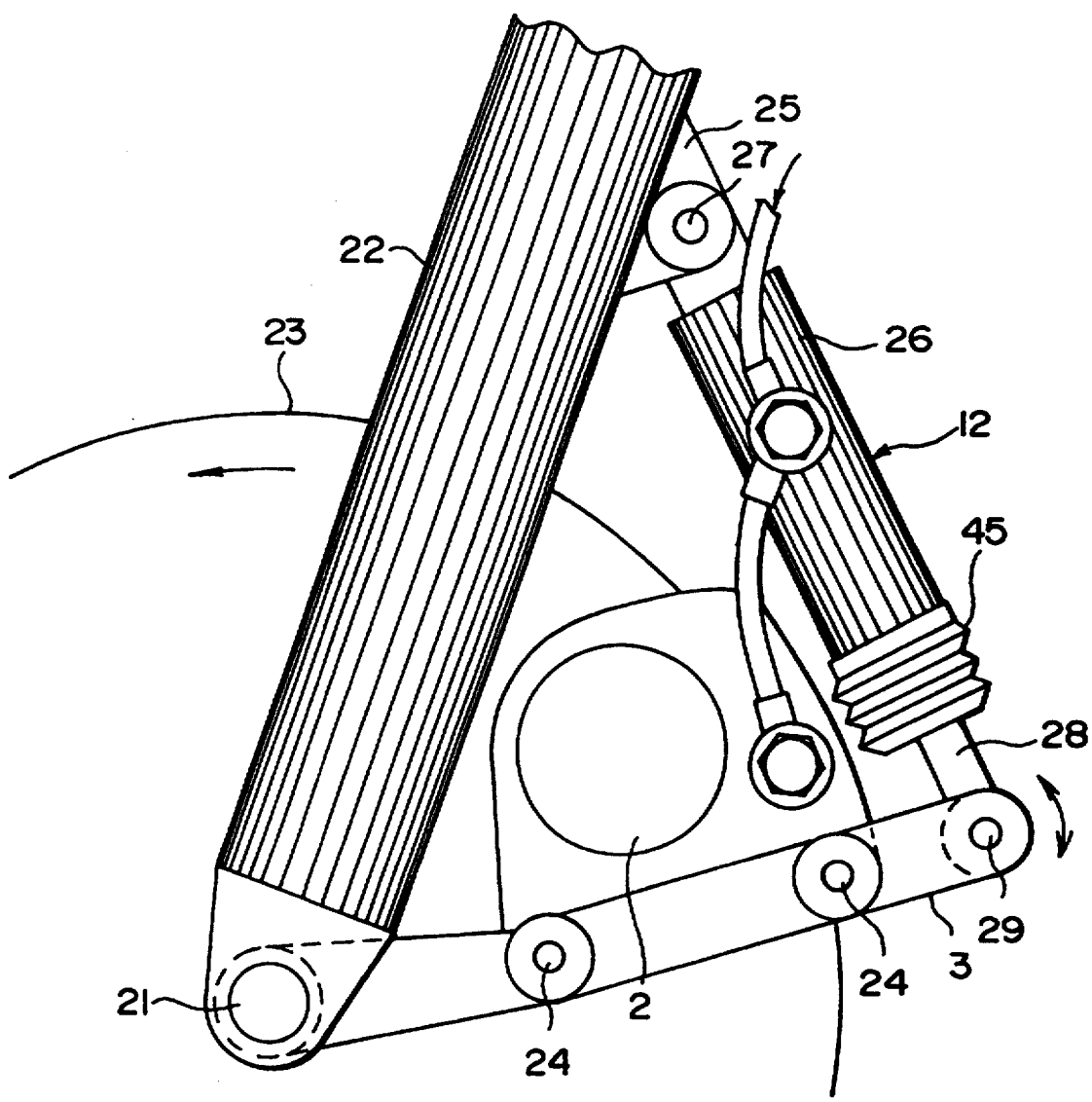
FIG. 2 is an enlarged lateral view of the brake caliper and regulator shown in FIG. 1.

As shown in FIG. 2, the brake disc 23 rotates together with the front wheel of the motorcycle about the axle 21 of same as center. The brake caliper 2 is fixed by bolts 24 to the center portion of a link 3 connected to the axle 21 such that one of the link ends is free to oscillate.

A regulator 12 connects the other end of the link 3 and the center portion of a front fork 22 supporting the axle on the motorcycle frame. The link 3, regulator 12 and front fork 22 form an approximately triangular shape.

The regulator 12 comprises a cylinder 26, and a torque detection rod 28 protruding from the cylinder 26 such that it is free to slide. The base of the cylinder 26 is connected to a bracket 25 formed on the front fork 22 via a pin 27. The end of the torque detection rod 28 protruding from the cylinder 26 is connected to the link 3 via a pin 29.

Figure 3:
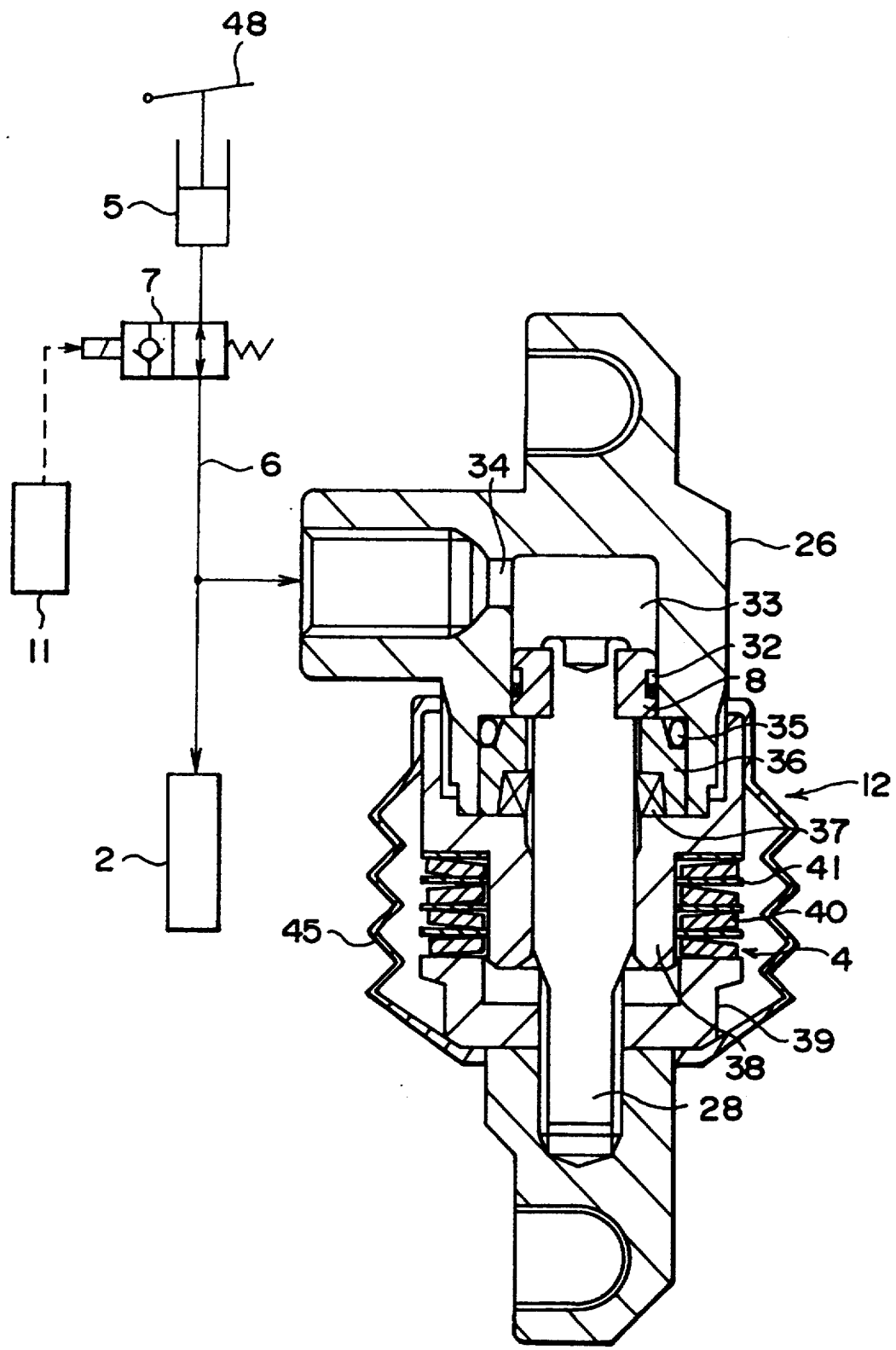
FIG. 3 is a vertical sectional view through a regulator.

The structure of the interior of the cylinder 26 is shown in FIG. 3. A piston 8 is fixed to the end of the torque detection rod 28 inside the cylinder 26. The piston 8 is free to slide inside the cylinder 26 via a piston ring 32. An oil chamber 33 is formed inside the cylinder 26 by the piston 8, this chamber 33 being connected via a narrow passage 34 to the pressure passage 6. As shown in FIG. 1, the passage 34 has a damping effect on any rapid expansion or contraction of the oil chamber 33.

An oil passage, not shown, is also formed vertically in the piston 8. In the cylinder 26, oil flows through this passage according to the sliding action of the piston 8. The volume of oil flowing through the passage 34 is therefore equivalent to the penetration volume of the torque detection rod 28. The cylinder 26 is sealed by an 0 ring 35, a circular seal case 36 and a seal 37 which slides on the torque detection rod 28.

The torque detection rod 28 protrudes outside the cylinder 26 along a rod guide 38 fixed to the cylinder 26. A support spring 4 is inserted between this rod guide 38 and a spring guide 39 fixed to the torque detection rod 28. The support spring 4 comprises four flat springs 40, and four circular spring seats 41 inserted between these flat springs 40. Due to the elastic restoring force of the flat springs 40, the torque detection rod 28 is pulled in such a direction as to enlarge the oil chamber 33.

As shown in FIG. 1, an electromagnetic shutoff valve 7 is inserted in the pressure passage 6. This shutoff valve 7 shuts off the pressure passage 6 according to a signal input from a controller 11.

An oil pressure sensor 9 is inserted in the pressure passage 6. The oil pressure sensor 9 detects the oil pressure in the pressure passage 6, and inputs an oil pressure signal to the controller 11. A torque sensor 10 consisting of a strain gauge or the like is also interposed between the front fork 22 and the regulator 12. When the brake caliper 2 applies a braking force to the brake disc 23, a force in the rotation direction of the brake disc 23 acts on the brake caliper 2 due to the reaction. This force transmits a moment to the link 3 about the axle 21, and as a result, the regulator 12 supporting the end of the link 3 is compressed. From this compressive load, the torque sensor 10 detects the braking torque generated between the brake caliper 2 and the brake disc 23, and outputs a torque signal to the controller 11.

In the controller 11, an input pressure signal is compared to the torque signal, and if the torque signal is outside a predetermined range, it is judged that the brake disc 23 is in a pre-lock condition, or in other words that the wheel has begun to slip with respect to the road surface. A signal is then output to the electromagnetic shutoff valve 7 to shut off the oil supply from the master cylinder 5 to the pressure passage 6.

During normal running, the electromagnetic shutoff valve 7 connects the master cylinder 5 to the pressure passage 6. If the brake pedal 48 is depressed in this condition, the oil pressure P supplied by the master cylinder 5 to the brake caliper 2 rises so that the caliper 2 applies a braking force to the brake disc 23. The braking torque Tr is generated between the wheel and the road surface as a reaction. This torque is transmitted to the torque detection rod 28 via the wheel, brake disc 23, brake caliper 2 and link 3, and the piston 8 reduces the volume of the oil chamber 33 while compressing the support spring 4. The piston 8 comes to rest when this compressive load balances the restoring force of the support spring 4. If the oil pressure P or the braking torque Tr should change, the piston 8 slides to a new balance point.

Figure 4:
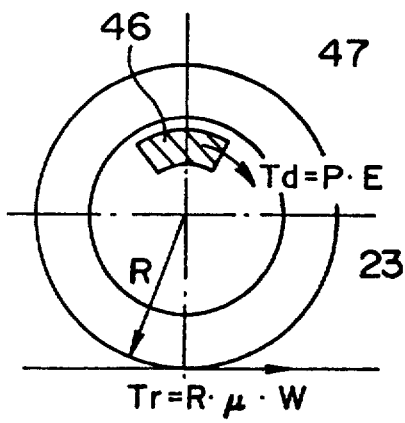
FIG. 4 is a descriptive diagram showing the relation between a braking torque Tr acting on the road surface, and a potential torque Td which can be obtained from the braking caliper.
Figure 5:
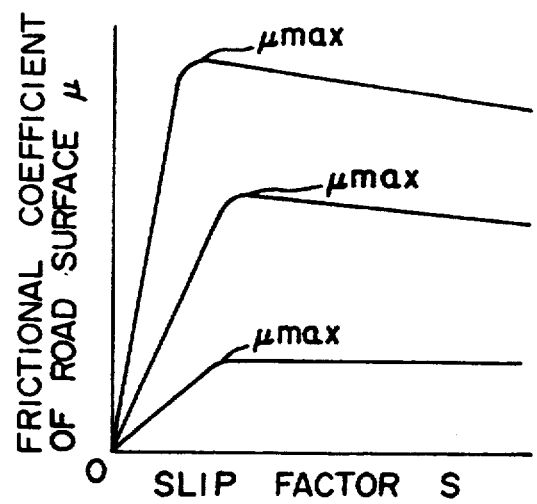
FIG. 5 is a graph showing the relation between the frictional coefficient of the road surface $\mu$, and the slip factor S.

Considering the static balance of forces with reference to FIG. 4, the potential torque Td which can be transmitted by the pad 46 of the brake caliper 2 to the brake disc 23 increases in linear proportion to the oil pressure P led to the brake $\mu$disc 23 from the pressure passage 6. On the other hand, the braking torque Tr with respect to the road surface may be expressed by the relation $Tr = R \times \mu \times W$ where R is the radius of the wheel, $\mu$ is the frictional coefficient of the road surface, and W is the load. As shown in FIG. 5, since there is a limit to the frictional coefficient $\mu$ with the road surface, there is a maximum value $Tr_{max}$ which is not exceeded.

When the brakes are functioning correctly, $Td = Tr$. This is subject to the condition $Td < Tr_{max}$, i.e. if $Td < Tr_{max}$, $Td = Tr$.

Figure 6:
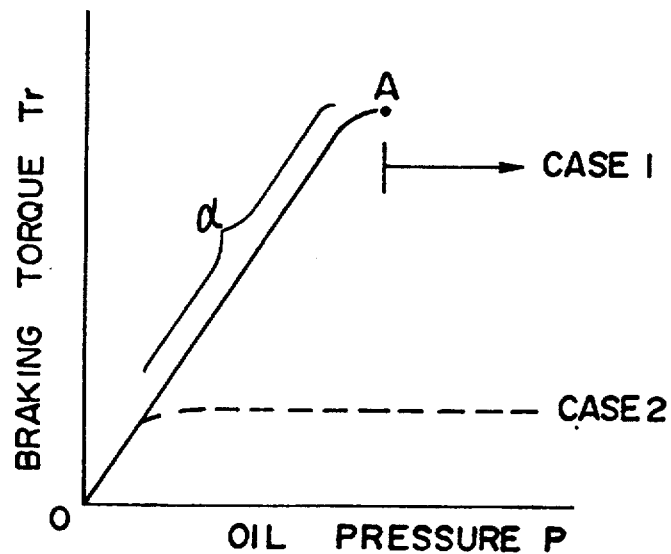
FIGS. 6–9 are graphs showing the relation between the braking torque Tr and a hydraulic pressure P.

$Tr_{max}$ varies with the type of road surface and the load. However, if the frictional coefficient of the pad 46 of the brake caliper 2 is constant, the brake torque Tr is in proportion to the oil pressure P up to a point A at which $Tr_{max}$ is attained as shown in FIG. 6. If an oil pressure P is applied exceeding $Tr_{max}$, a wheel 47 locks.

As shown in FIG. 6, the braking torque Tr is a maximum at the point A when it is equal to $Tr_{max}$. Locking of the wheel may be due to several factors, for example the fact that the oil pressure P has passed the point A (Case 1).

Even if the oil pressure P lies within the range designated by $\alpha$ on the graph in FIG. 6, locking may occur when the motorcycle begins running on a road surface with a lower frictional coefficient $\mu$, or the load W temporarily falls due to undulations of the road surface (Case 2). In the latter case, the relation of the braking torque to the oil pressure P changes from a characteristic shown by the solid line to a characteristic shown by the broken line in FIG. 6.

By detecting the oil pressure P and the braking torque Tr, therefore, it can be judged whether or not the braking situation Corresponds to Case 1 or to Case 2.

Figure 7:
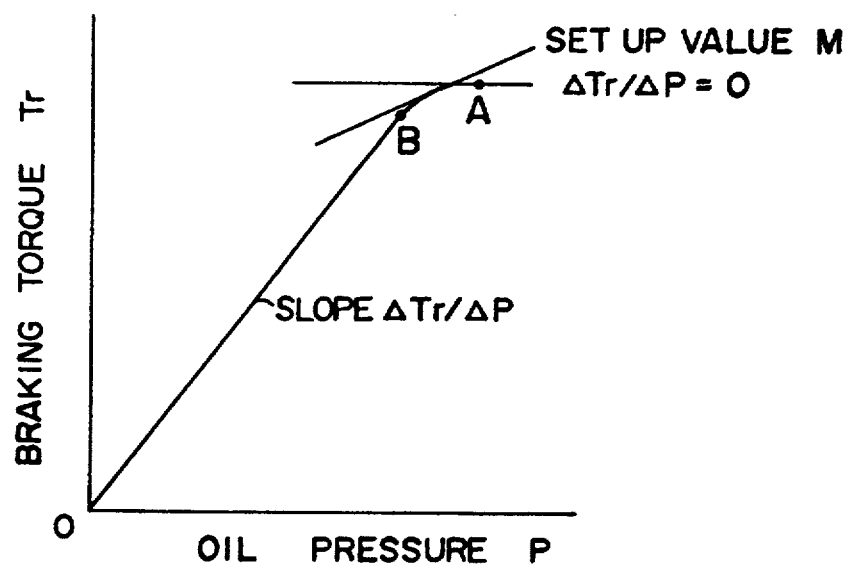

In order to judge the aforesaid Case 1, the ratio of the road surface braking torque variation Tr to the pressure variation $\Delta P$, $\Delta Tr/\Delta P$, is computed. In FIG. 7, when the oil pressure P rises from the point 0, the slope $\Delta Tr/\Delta P$ of the straight line is a constant value in the interval OB wherein the oil pressure P and braking torque Tr are in a linear relation to one another. Beyond the point B, $\Delta Tr/\Delta P$ gradually decreases, and at the point A, $\Delta Tr/\Delta P=0$. In other words, if this value is greater than 0, it is judged that the braking situation does not correspond to Case 1. In practice, a slope M between the point B and the point A is set up as a reference value by the controller 11. Then, if the condition $\Delta Tr/\Delta P < M$ holds, the controller 11 judges that the oil pressure P lies just before the point A, and outputs a signal to the electromagnetic shutoff valve 7 so that the oil supply from the master cylinder 5 to the pressure passage 6 is shut off.

Figure 8:
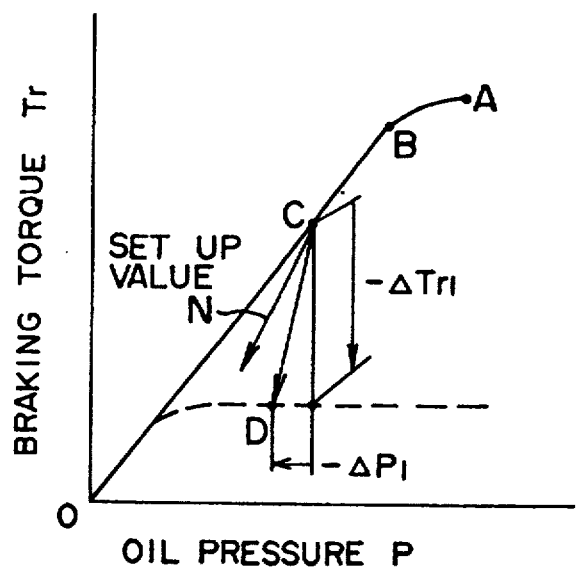

Case 2 is judged in the following way. In FIG. 8, when the wheel 47 moves onto a road surface with a low frictional coefficient from the point C to the point D, a variation $-\Delta Tr_1$ appears in the road surface braking torque Tr. Due to this torque variation $-\Delta Tr_1$, the feedback piston 8 elongates so that the volume of the oil chamber 33 increases and the oil pressure P decreases. As the electromagnetic shutoff valve 7 is open and the master cylinder 5 is connected to the brake caliper 2, the pressure variation $-\Delta P_1$ of the oil pressure P has only a small value of the order of the pressure loss in the passage 6. The slope $\Delta Tr_1/\Delta P_1$ of the straight line connecting point C and point D is therefore greater than the slope $\Delta Tr/\Delta P$ of the straight line from point 0 to point B. In practice, a slope N between $\Delta Tr_1/\Delta P_1$ and $\Delta Tr/\Delta P$ is set up as a reference value by the controller 11. Then, if the condition $-\Delta Tr/-\Delta P = \Delta Tr/\Delta P > N$ holds, the controller 11 judges that there has been an abnormal decrease of the braking torque Tr, and outputs a signal to the electromagnetic shutoff valve 7 so that the oil supply from the master cylinder 5 to the pressure passage 6 is shut off. The aforesaid control procedure is performed with respect to variation of Tr also in the case wherein the load W has decreased.

Summarizing the aforesaid results, if the condition $\Delta Tr/\Delta P < M$ is satisfied, or the conditions $\Delta Tr < 0$ and $\Delta Tr/\Delta P > N$ are satisfied, the controller 11 judges that the wheel 47 is in a pre-lock condition, and outputs a signal to the electromagnetic shutoff valve 7 so that the supply of oil pressure from the master cylinder 5 to the brake caliper 2 is shut off.

Generally, even after the pressure passage 6 is shut off, the wheel 47 can be locking due to a change of road surface conditions, for example. In this antilock mechanism, however, when the braking torque Tr decreases, the piston 8 enlarges the oil chamber 33 due to the reaction of the support spring 4, and the oil pressure P applied to the brake caliper 2 temporarily decreases. The wheel 47 therefore does not lock completely.

If the braking torque Tr varies when it is balancing the support spring 4 at some oil pressure P, the volume of the oil chamber 33 increases and decreases with the motion of the piston 8, and the oil pressure P applied to the brake caliper 2 also varies.

Figure 9:
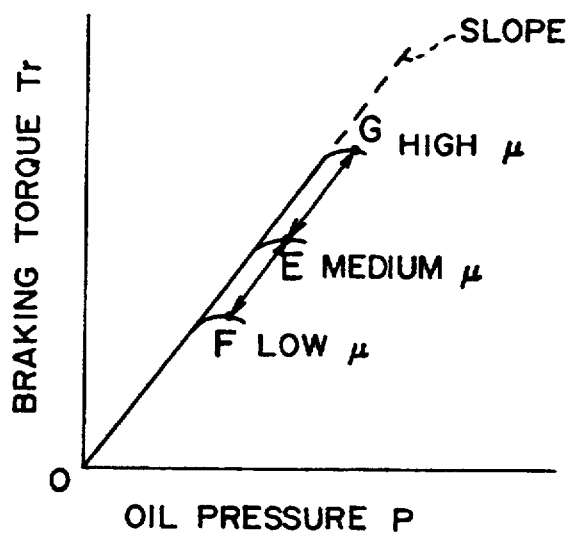

In such a case wherein the oil pressure P varies due to variation of the braking torque Tr, if the characteristics of the support spring 4 are set such that the increase or decrease of pressure gain matches the slope of the straight line portion of FIG. 9, the oil pressure P can be controlled so that the braking torque after the variation approaches the maximum braking torque under the conditions obtaining after the variation even if the road surface frictional coefficient $\mu$, load W, etc., have varied. In other words, the characteristics of the support spring 4 can be set such that the oil pressure P varies from point E to point G if for example the frictional coefficient of the road jumps from medium to high, and such that the oil pressure P varies from point E to point F if the frictional coefficient drops from medium to low. By means of this setting, locking of the wheel 47 is not only prevented but efficient braking is also performed.

Figure 10:
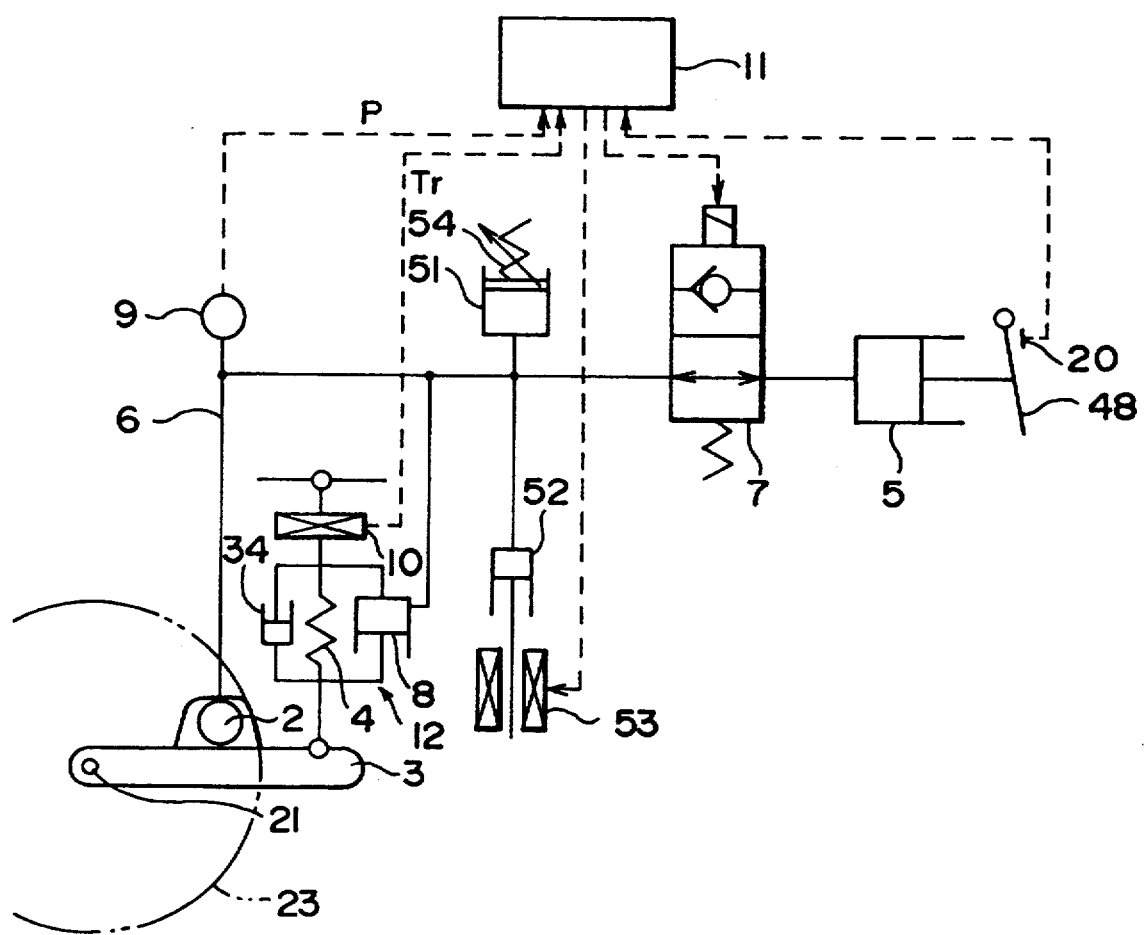
FIG. 10 is similar to FIG. 1, but shows a second embodiment of this invention.

FIG. 10 shows a second embodiment of this invention. In this embodiment, an accumulator 51 is connected to the pressure passage 6, and the oil pressure of the pressure passage 6 is adjusted by a pressure adjusting chamber 52 having a piston driven by a solenoid 53.

By adjusting the load of a spring 54 of the accumulator 51, the relation between the oil volume variation $\Delta V$ and the pressure variation $\Delta P$ of the pressure passage 6 can be adjusted.

Further, any excess or insufficiency of pressure decrease or increase can be corrected if the gain setting of pressure increase or decrease is inadequate by moving the control piston 52 using the linear solenoid 53.

Figure 11:
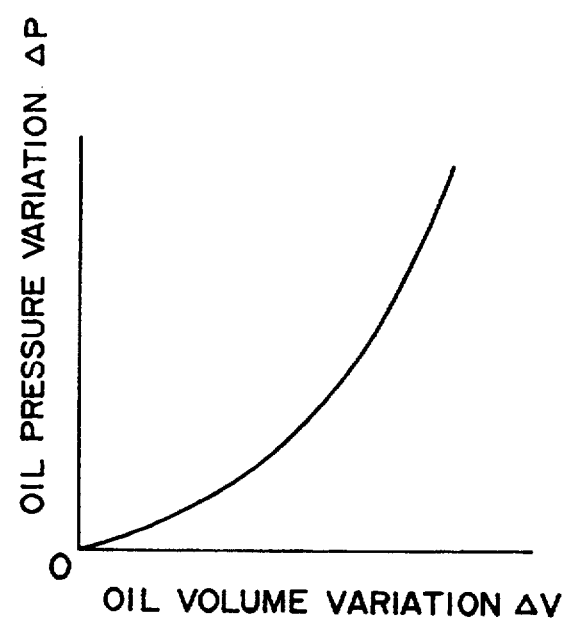
FIG. 11 is a graph showing the relation between the pressure fluctuation amount $\Delta P$ and the oil volume fluctuation amount $\Delta V$ in the oil chamber of the regulator.

If therefore the increase and decrease of volume variation $\Delta V$ with pressure variation $\Delta P$ of the oil chamber 33 are not linear due to the action of the piston 8 as shown in FIG. 11, they can be made to coincide with the straight line shown in FIG. 9 by adjusting the spring 54 and operating the piston in the pressure adjusting chamber 52. The use of both the accumulator 51 and the pressure adjusting chamber 52 is not indispensable, it being possible to perform the adjustment with either one of them alone.

Figure 12:
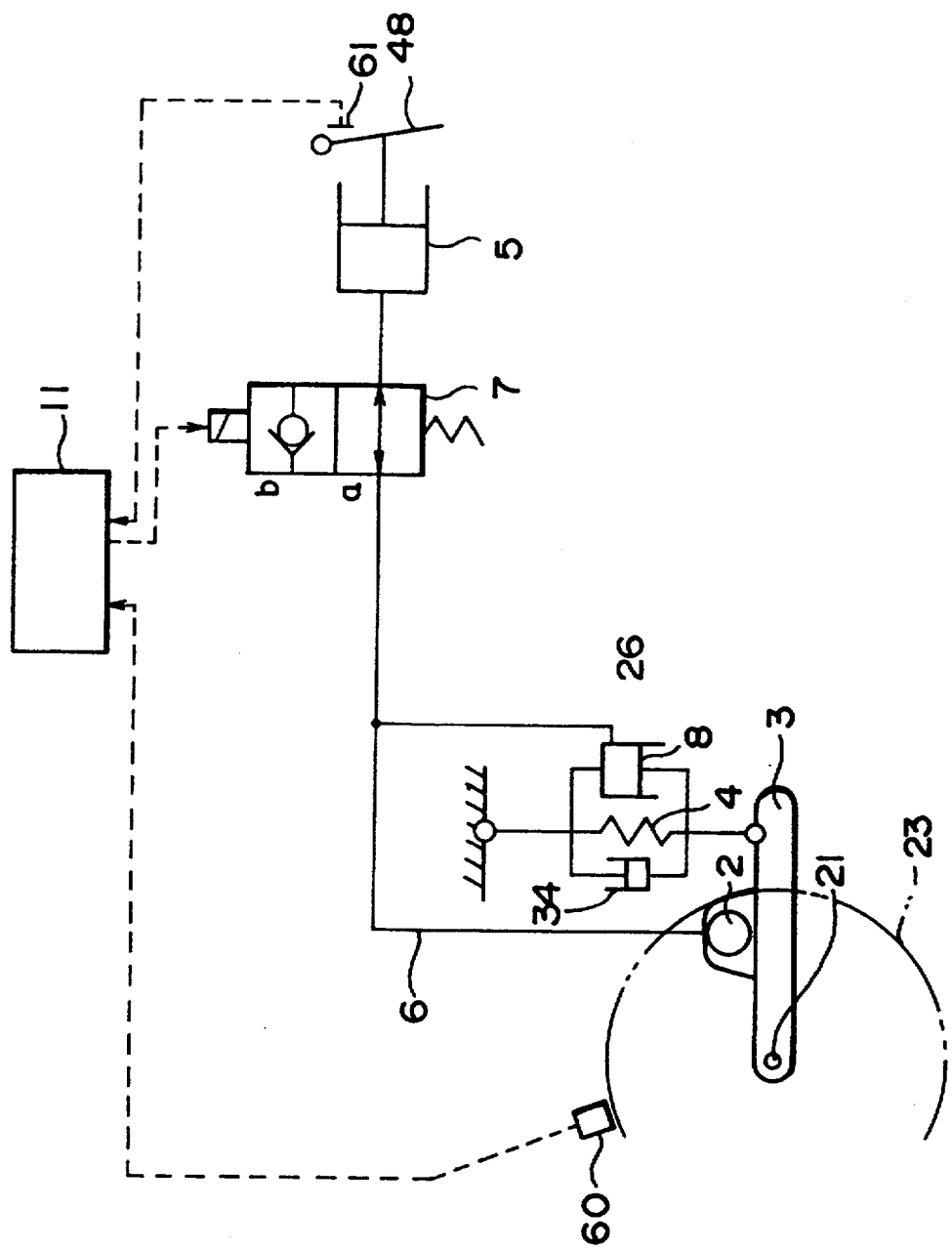
FIG. 12 is similar to FIG. 1, but shows a third embodiment of this invention.

FIG. 12 shows a third embodiment of this invention.

In this embodiment, a speed sensor 60 which detects the rotation speed of the wheel and a brake switch 61 which detects the depression of the brake pedal 48 are used instead of the oil pressure sensor 9 and the torque sensor 10.

When the brake switch 61 is ON, the controller 11 calculates the motorcycle's speed from the rotation speed of the wheel detected by the speed sensor 60, and computes a slip factor S from the following relation using this calculated speed and the real speed of the motorcycle: Slip factor S=(Real Speed-Calculated Speed)/Real Speed The real speed may be found by for example fitting a speed sensor 60 to the front and back wheels respectively, and taking the higher value. Alternatively, the speed at a certain time after the brake pedal 48 is depressed may be calculated based on a predetermined acceleration, for example $-1.2$ G, and used as the real speed.

The slip factor S is related to the road surface frictional coefficient u as shown in FIG. 5. The controller 11 therefore shuts the electromagnetic valve 7 at a point such that the calculated slip factor S does not exceed the slip factor S at which the frictional coefficient $\mu$ is a maximum value $\mu_{max}$.

Figure 13:
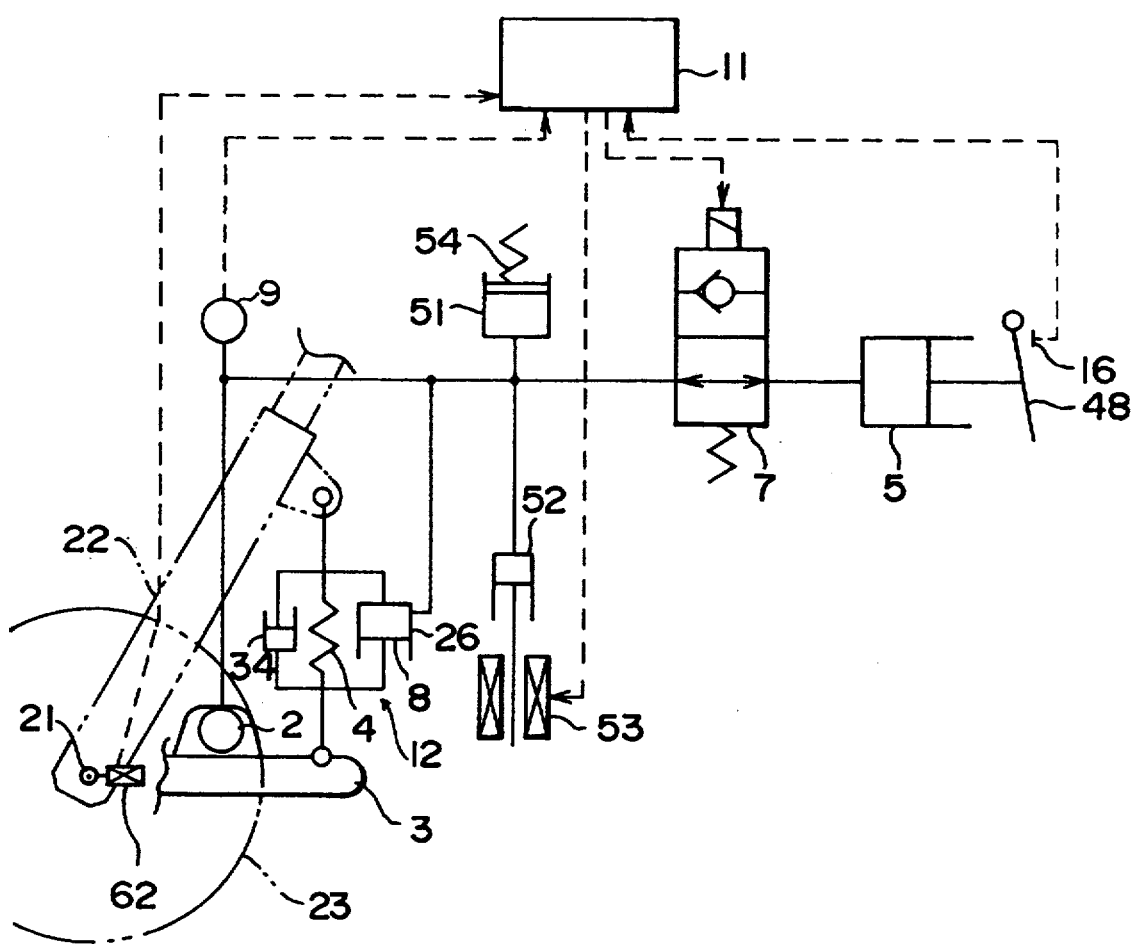
FIG. 13 is similar to FIG. 1, but shows a fourth embodiment of this invention.

FIG. 13 shows a fourth embodiment of this invention.

In this embodiment, a load sensor 62 is installed between the front fork 22 supporting the front wheel and the axle 21. During braking, the load in the front direction due to the motorcycle's inertia acts between the front fork 22 and the axle 21. This load is greater for greater deceleration and smaller for larger slip factors. The controller 11 therefore determines whether the wheel is in a pre-lock condition by judging whether the load in the front direction detected by the load sensor 62 is less than a predetermined value with respect to the braking pressure detected by the oil pressure sensor 9.

Figure 14:
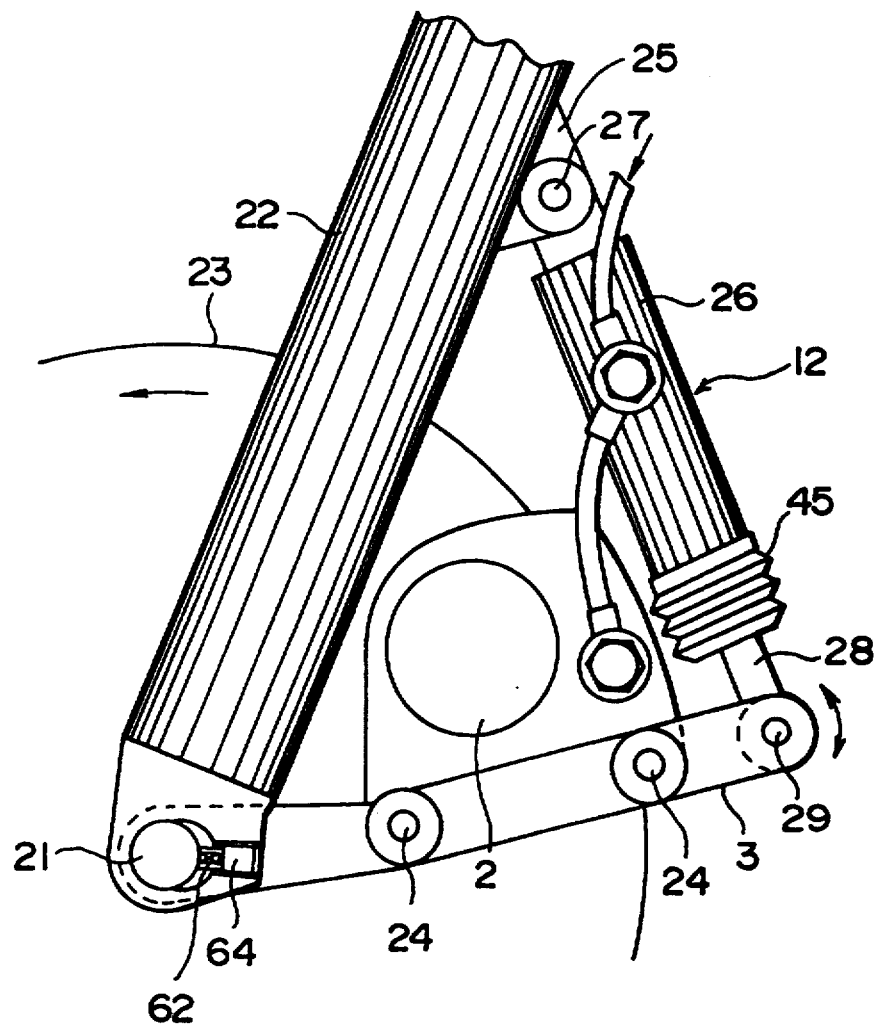
FIG. 14 is an enlarged view of the brake caliper and regulator showing yet a further embodiment of this invention relating to a load sensor assembly.

As shown in FIG. 14, an axle support hole 22B of a lower bracket 22A of the front fork 22 can be formed as a slit, and the load sensor 62 attached to a support piece 64 provided between the bracket 22A and the axle 21.

Alternatively, as the axle 21 is distorted by the inertia acting on the frame during braking, a deformation sensor may be fitted to the axle 21, and the pre-lock condition of the wheel determined by judging whether the detected deformation is less than a predetermined value with respect to the braking pressure.

The foregoing description of the preferred embodiments for the purpose of illustrating this invention is not to be considered as limiting or restricting the invention, since many modifications may be made by those skilled in the art without departing from the scope of the invention.

The embodiments of this invention in which an exclusive property or privilege is claimed are defined as follows:

1. An antilock mechanism for a motorcycle brake comprising:
    a brake disc rotating together with a wheel about an axle, said axle being supported by a motorcycle frame via a support member;
    a brake calliper which, applies a braking force to the brake disc depending on a supplied oil pressure;
    a master cylinder which generates oil pressure;
    operating means for operating said master cylinder;
    a pressure passage connecting said master cylinder to said brake calliper;
    a link supporting said brake calliper connected to said axle such that said link is free to oscillate;
    an oil chamber connected to said pressure passage, said chamber enlarging and contracting according to the oscillation of said link;
    an electromagnetic valve operable to close said pressure passage;
    a pressure adjusting chamber connected to said pressure passage, said pressure adjusting chamber having a piston driven by a solenoid to adjust the pressure in said pressure passage;
    a sensor means for detecting the pressure of said pressure passage;
    detecting means for detecting the braking action resulting from the application of said braking force by said brake calliper on said brake disc;
    judging means for judging whether the ratio of the pressure detected by said sensor means and the braking action detected by the detecting means is within a predetermined range; and
    means for closing said electromagnetic valve when said judging means determines that said ratio is outside of said predetermined range.

2. An antilock mechanism for a motorcycle brake comprising:
    a brake disc rotating together with a wheel about an axle, said axle being supported by a motorcycle frame via a support member;
    a brake calliper which applies a braking force to the brake disc depending on a supplied oil pressure;
    a master cylinder which generates oil pressure;
    operating means for operating said master cylinder;
    a pressure passage connecting said master cylinder to said brake calliper;
    a link supporting said brake calliper connected to said axle such that said link is free to oscillate;
    an oil chamber connected to said pressure passage, said chamber enlarging and contracting according to the oscillation of said link;
    an electromagnetic valve operable to close said pressure passage;
    a controller for regulating the pressure in said pressure passage driven by a solenoid;
    a sensor means for detecting the pressure of said pressure passage;
    detecting means for detecting the braking action resulting from the application of said braking force by said brake calliper on said brake disc;
    judging means for judging whether the ratio of the pressure detected by said sensor means and the braking action detected by the detecting means is within a predetermined range; and
    means for closing said electromagnetic valve when said judging means determines that said ratio is outside of said predetermined range.

* * * * *